United States Patent
Law et al.

(10) Patent No.: US 8,011,610 B2
(45) Date of Patent: Sep. 6, 2011

(54) FISHING REEL HANDLE ASSEMBLY

(75) Inventors: Bi Rong Law, Johor (MY); Mohamed Shahril Bin Mohamed Faisal, Johor (MY)

(73) Assignee: Shimano Components (Malaysia) SDN. BHD., Pontian, Johor (MY)

( * ) Notice: Subject to any disclaimer, the term of this patent is extended or adjusted under 35 U.S.C. 154(b) by 0 days.

(21) Appl. No.: 12/761,060

(22) Filed: Apr. 15, 2010

(65) Prior Publication Data

US 2010/0301150 A1 Dec. 2, 2010

(30) Foreign Application Priority Data

May 29, 2009 (JP) .................................. 2009-130738

(51) Int. Cl.
*A01K 89/01* (2006.01)

(52) U.S. Cl. ............................ 242/283; 242/284; 74/545

(58) Field of Classification Search .................. 242/311, 242/312, 282–284; D22/140, 141; 74/545–547
See application file for complete search history.

(56) References Cited

U.S. PATENT DOCUMENTS

| | | | |
|---|---|---|---|
| 847,890 A * | 3/1907 | Blackburn | 242/267 |
| 3,089,663 A * | 5/1963 | Kirby, Sr. | 242/223 |
| 3,375,993 A * | 4/1968 | Hayes | 242/284 |
| 3,727,857 A * | 4/1973 | Chann | 242/229 |
| 3,990,323 A * | 11/1976 | Kamikawa | 242/284 |
| 5,150,853 A * | 9/1992 | Bernard et al. | 242/283 |
| 5,183,221 A * | 2/1993 | Kawai et al. | 242/310 |
| 6,032,893 A * | 3/2000 | Sekimoto et al. | 242/283 |
| 6,112,617 A * | 9/2000 | Abrams et al. | 74/545 |
| 6,364,229 B1 * | 4/2002 | Kang | 242/283 |
| 7,191,969 B2 * | 3/2007 | Miyazaki et al. | 242/283 |
| 2003/0140548 A1* | 7/2003 | Lu | 43/20 |
| 2009/0283619 A1* | 11/2009 | Young | 242/283 |
| 2010/0243781 A1* | 9/2010 | Hayashi | 242/224 |

FOREIGN PATENT DOCUMENTS

| | | |
|---|---|---|
| JP | 2002-360136 A | 12/2002 |
| JP | 2007-000022 A | 1/2007 |

* cited by examiner

*Primary Examiner* — Emmanu M Marcelo
(74) *Attorney, Agent, or Firm* — Global IP Counselors, LLP

(57) ABSTRACT

A fishing reel handle assembly has a handle shaft, handle knobs, first and second handle arms, and an arm attachment. The handle knobs are respectively rotatably attached to the attachment ends of the first and second handle arms. The arm attachment is configured to rotate integrally with the handle shaft. The arm attachment includes a first attachment portion that allows the base end of the first handle arm to be detachably attached to the first attachment portion. The first attachment portion prevents the base end of the first handle arm from rotating about a first axis. The second attachment portion allows the base end of the second handle arm to be detachably attached to the second attachment portion. The second attachment portion prevents the base end of the second handle arm from rotating about a second axis.

12 Claims, 8 Drawing Sheets

FISHING REEL HANDLE ASSEMBLY

CROSS-REFERENCE TO RELATED APPLICATIONS

This application claims priority to Japanese Patent Application No. 2009-130738 filed on May 29, 2009, the entirety of which is hereby incorporated by reference in its entirety.

BACKGROUND

1. Field of the Invention

The present invention relates to a handle assembly, particularly to a fishing reel handle assembly configured to rotate integrally with a handle shaft of the fishing reel.

2. Background Information

In a fishing reel (e.g., the spinning reel and the dual-bearing reel), a handle assembly is rotatably attached to a reel body in order to rotate a rotor or a spool. The fishing reel handle assembly includes a handle knob and a handle arm configured to rotate integrally with a handle shaft. The handle assembly is classified into either a double-handle assembly or a single-handle assembly. In the double-handle assembly, a handle shaft is attached to the intermediate part of a handle arm whereas handle knobs are attached to both ends of the handle arm. In the single-handle assembly, on the other hand, a handle shaft is attached to the base end of a handle arm whereas a handle knob is attached to the front end of the handle arm.

Further, the spinning reel handle assembly includes a handle arm, a handle knob, and a handle shaft attached to a master gear. On the other hand, the dual bearing reel handle assembly includes a handle knob and a handle arm attached to a handle shaft while being integrally rotatable with it.

The fishing reel is normally provided with either the single-handle assembly or the double-handle assembly at the time of purchase. When the currently-attached handle assembly is desired to be exchanged with the other typed one after purchase, it is necessary to purchase the desired one.

In response to the above, for example, Laid-open Japan Patent Publication No. JP-A-2002-360136 describes a fishing reel handle assembly configured to be interchangeably used as either the single-handle assembly or the double-handle assembly. The fishing reel handle assembly includes handle knobs, a pair of handle arms and an arm attachment. The handle knobs are attached to the front ends of the handle arms, respectively. The arm attachment is engaged with a handle shaft while being integrally rotatable with it. The base ends of the handle arms are firmly screwed into the arm attachment. According to the handle assembly with the foregoing structure, the single-handle assembly is produced by screwing either of the handle arms into the arm attachment, whereas the double-handle assembly is produced by screwing both of the handle arms into the arm attachment.

According to the above structure, the handle arm is firmly screwed into the arm attachment. The structure makes it difficult to align orientations of the handle knobs in parallel to the handle shaft when the handle arm is attached to the arm attachment.

In view of the above, it will be apparent to those skilled in the art from this disclosure that there exists a need for an improved fishing reel handle assembly. This invention addresses this need in the art as well as other needs, which will become apparent to those skilled in the art from this disclosure.

SUMMARY

An object is to align orientations of the handle knobs in parallel to the handle shaft in a fishing reel handle assembly configured to be interchangeably used as either a single-handle assembly or a double-handle assembly.

A first aspect relates to a fishing reel handle assembly. The fishing reel handle assembly includes a handle shaft, handle knobs, first and second handle arms, and an arm attachment. The handle knobs are rotatably attached to front ends of the first and second handle arms, respectively. The arm attachment is configured to rotate integrally with the handle shaft. The arm attachment includes first and second attachment portions. The first attachment portion allows a base end of one of the first and second handle arms to be detachably attached thereto. The first attachment portion also prevents the base end of the selected one of the first and second handle arms from rotating about a first axis intersecting the handle shaft. The second attachment portion allows a base end of the other of the first and second handle arms to be detachably attached thereto. The second attachment portion also prevents the base end of the other of the first and second handle arms from rotating about a second axis opposed to the first axis across the handle shaft.

When the fishing reel handle assembly is used as the double-handle assembly, the first handle arm is attached to one of the first and second attachment portions whereas the second handle arm is attached to the other of the first and second attachment portions. When the fishing reel handle assembly is used as the single-handle assembly, on the other hand, either of the first and second handle arms is attached to either of the first and second attachment portions. According to the first aspect, the first attachment portion of the arm attachment is designed to allow one of the first and second handle arms to be detachably attached thereto and to prevent the selected one of the first and second handle arms from rotating about the first axis intersecting the handle shaft. Simultaneously, the second attachment portion of the arm attachment is designed to allow the other of the first and second handle arms to be detachably attached thereto and to prevent the other of the first and second handle arms from rotating about the second axis intersecting the handle shaft. A first handle arm position about the first axis and a second handle arm position about the second axis can be thereby aligned for aligning the handle knobs, i.e., the axes of rotation or the shafts of the handle knobs, in parallel to the handle shaft.

A fishing reel handle assembly according to a second aspect relates to the fishing reel handle assembly according to the first aspect wherein, the first attachment portion includes a non-circular recess or aperture formed along a first axial direction and the second attachment portion includes a non-circular recess or aperture formed along a second axial direction. The first handle arm includes a non-circular shaft at the base end thereof and the noncircular shaft of the first handle arm is configured to be engaged with one of the non-circular recesses or apertures of the first and second attachment portions. On the other hand, the second handle arm includes a non-circular shaft at the base end thereof and the non-circular shaft of the second handle arm is configured to be engaged with the other of the non-circular recesses or apertures of the first and second attachment portions. According to the second aspect, the non-circular shafts of the first and second handle arms are interchangeably engaged with the non-circular recesses or apertures of the first and second attachment portions, respectively. The first and second handle arms can be thereby attached to the first and second attachment portions while being prevented from rotating about the first and second axes, respectively. Consequently, the first and second handle arms can be attached to the first and second attachment portions, respectively, with the simple engagement structures between the shafts and the recesses or apertures.

A fishing reel handle assembly according to a third aspect relates to the fishing reel handle assembly according to the second aspect, and the reel handle assembly further includes a weight member. The weight member includes at least one non-circular shaft on a base end thereof. The weight member is also configured to be engaged with at least either of the non-circular recesses of the first and second attachment portions. When the fishing reel handle assembly is herein used as the single-handle assembly, the weight member can be attached to one of the first and second attachment portions to which the handle arm is not attached. Therefore, the rotational balance of the fishing reel handle assembly will be enhanced even if the fishing reel handle assembly is used as the single-handle assembly.

A fishing reel handle assembly according to a fourth aspect relates to the fishing reel handle assembly according to one of the second and third aspects, and the fishing reel handle assembly further includes first and second screw members. The first and second screw members are inserted into the first and second attachment portions along handle attachment directions intersecting the first and second axes, respectively. The first and second screw members are further screwed into the base ends of the first and second handle arms, respectively. According to the fourth aspect, the first and second handle arms are secured to the first and second attachment portions by the first and second screw members, respectively. With this structure, the first and second handle arms can be easily attached to or detached from the first and second attachment portions, respectively.

A fishing reel handle assembly according to a fifth aspect relates to the fishing reel handle assembly according to one of the first to fourth aspects, wherein the fishing reel handle assembly is exclusively for a spinning reel. The handle shaft is configured to rotate integrally with the arm attachment. One end of the handle shaft is coupled to a master gear shaft for allowing the handle shaft to rotate integrally with the master gear, whereas the other end of the handle shaft is coupled to the arm attachment.

According to the fifth aspect, orientations of the handle knobs can be aligned even if the fishing reel handle assembly is exclusively for the spinning reel and is further used as the double-handle assembly.

A fishing reel handle assembly according to a sixth aspect relates to the fishing reel handle assembly according to the fifth aspect, wherein the first and second axes are symmetrically positioned through the handle shaft while leaning towards an axial-outward direction of the handle shaft from a direction perpendicular to the handle shaft. According to the sixth aspect, the front ends of the first and second handle arms are separated from the base ends thereof in the outward direction of the handle shaft, respectively. The first and second handle arms can be thereby separated from a fishing line guide member of a rotor of a spinning reel.

A seventh aspect relates to a fishing reel handle assembly. The fishing reel handle assembly includes a handle shaft, handle knobs, first and second handle arms, and an arm attachment. The handle knobs are rotatably attached to front ends of the first and second handle arms, respectively. The arm attachment is configured to rotate integrally with the handle shaft. The arm attachment includes first and second attachment portions. The first attachment portion is irremovably attached to the first handle arm. The first attachment portion arranges the first handle arm along a first axis intersecting the axis of the handle shaft. The second attachment portion allows a base end of the other of the first and second handle arms to be detachably attached thereto. The second attachment portion also prevents the base end of the other of the first and second handle arms from rotating about a second axis opposed to the first axis across the handle shaft.

When the fishing reel handle assembly is used as the double-handle assembly, the second handle arm is attached to the second attachment portion. When the fishing reel handle assembly is used as the single-handle assembly, on the other hand, the second handle arm is detached from the second attachment portion. According to the seventh aspect, the first attachment portion of the arm attachment is irremovably attached to the first handle arm and arranges the first handle arm along a first axis intersecting the axis of the handle shaft. Simultaneously, the second attachment portion of the arm attachment is designed to allow the second handle arm to be detachably attached thereto and to prevent the second handle arm from rotating about the second axis intersecting the handle shaft. A first handle arm position about the first axis and a second handle arm position about the second axis can be thereby aligned for aligning the handle knobs, more specifically, aligning the axes of rotation or the shafts of the handle knobs, in parallel to the handle shaft.

A fishing reel handle assembly according to a eighth aspect relates to the fishing reel handle assembly according to the seventh aspect, wherein the first handle arm is integrally formed with the first attachment portion. According to the eighth aspect, Because the first handle arm is integrally formed with the first attachment portion, the first handle arm can be set up without backlash According to the foregoing aspects, the first and second attachment portions of the arm attachment are designed to allow the first and second handle arms to be counter-rotatably and detachably attached about the first and second shafts that intersect the handle shaft, respectively. Therefore, the position of the first handle arm about the first shaft and the position of the second handle arm about the second shaft can be set to align orientations of the handle knobs in parallel with the handle shaft.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
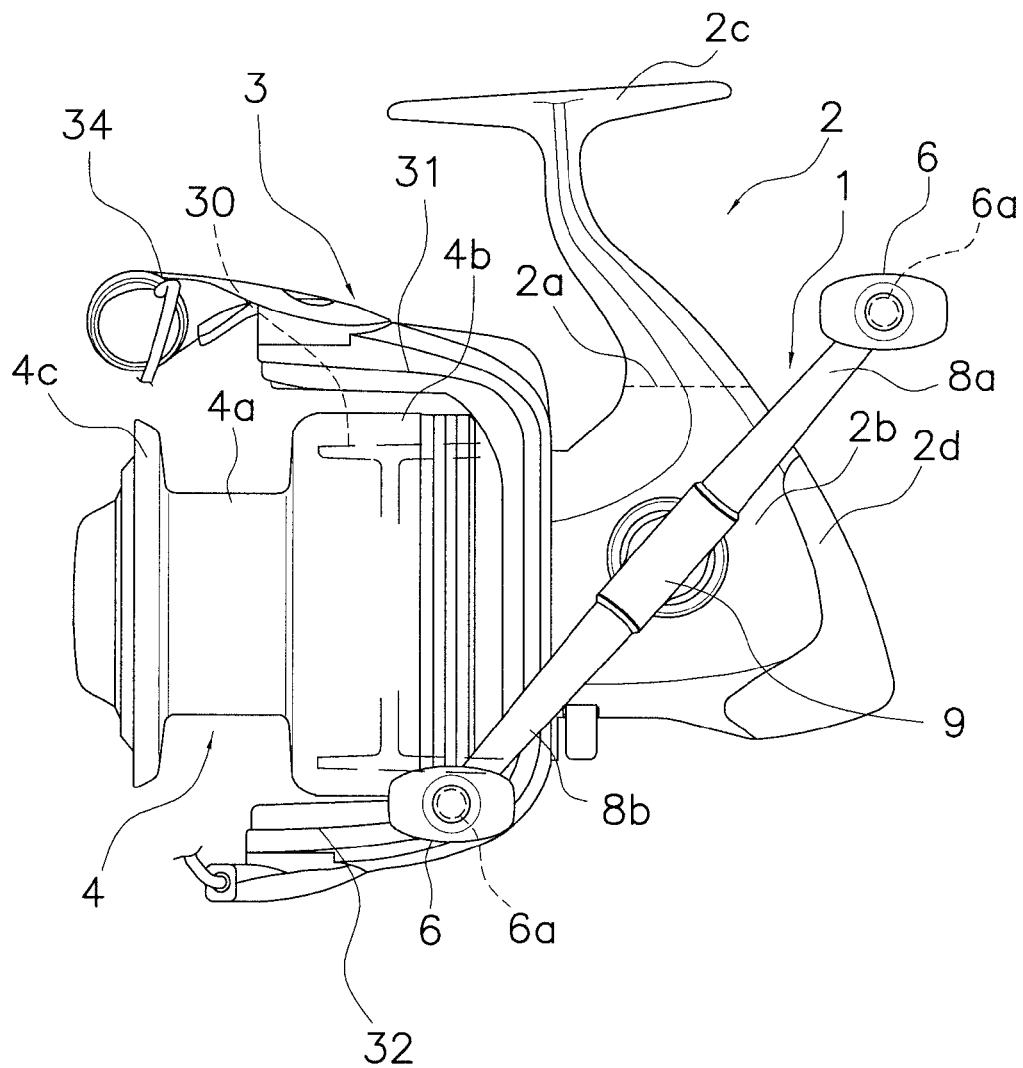
FIG. 1 is a side view of a spinning reel according to an exemplary embodiment.
Figure 2:
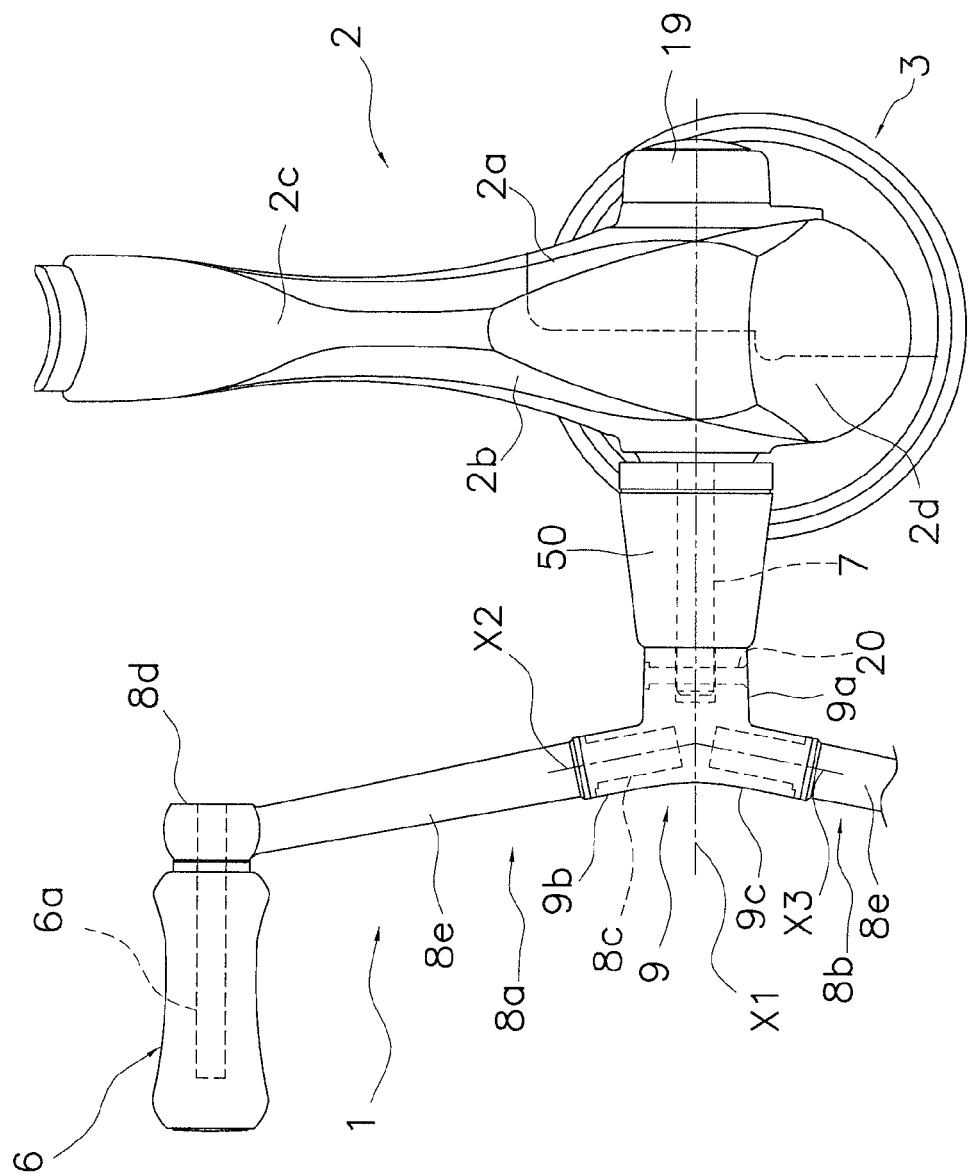
FIG. 2 is a rear view of the spinning reel of FIG. 1.

As illustrated in FIGS. 1 and 2, a spinning reel, in accordance with an exemplary embodiment, includes a handle assembly 1, a reel unit 2, a rotor 3 and a spool 4. The reel unit 2 rotatably supports the handle assembly 1. The rotor 3 winds a fishing line around the spool 4. The rotor 3 is rotatably supported by the front part of the reel unit 2. The spool 4 winds the fishing line onto its outer peripheral surface. The spool 4 is disposed in front of the rotor 3 while being reciprocatable back and forth. Note the handle assembly 1 is allowed to be attached either a left side (see FIGS. 1 and 2) of the reel unit 2 or a right side (not illustrated in the figure) thereof. A cap member 19 is attached to the remaining side of the reel unit 2 where the handle assembly 1 is not attached.

Figure 5:
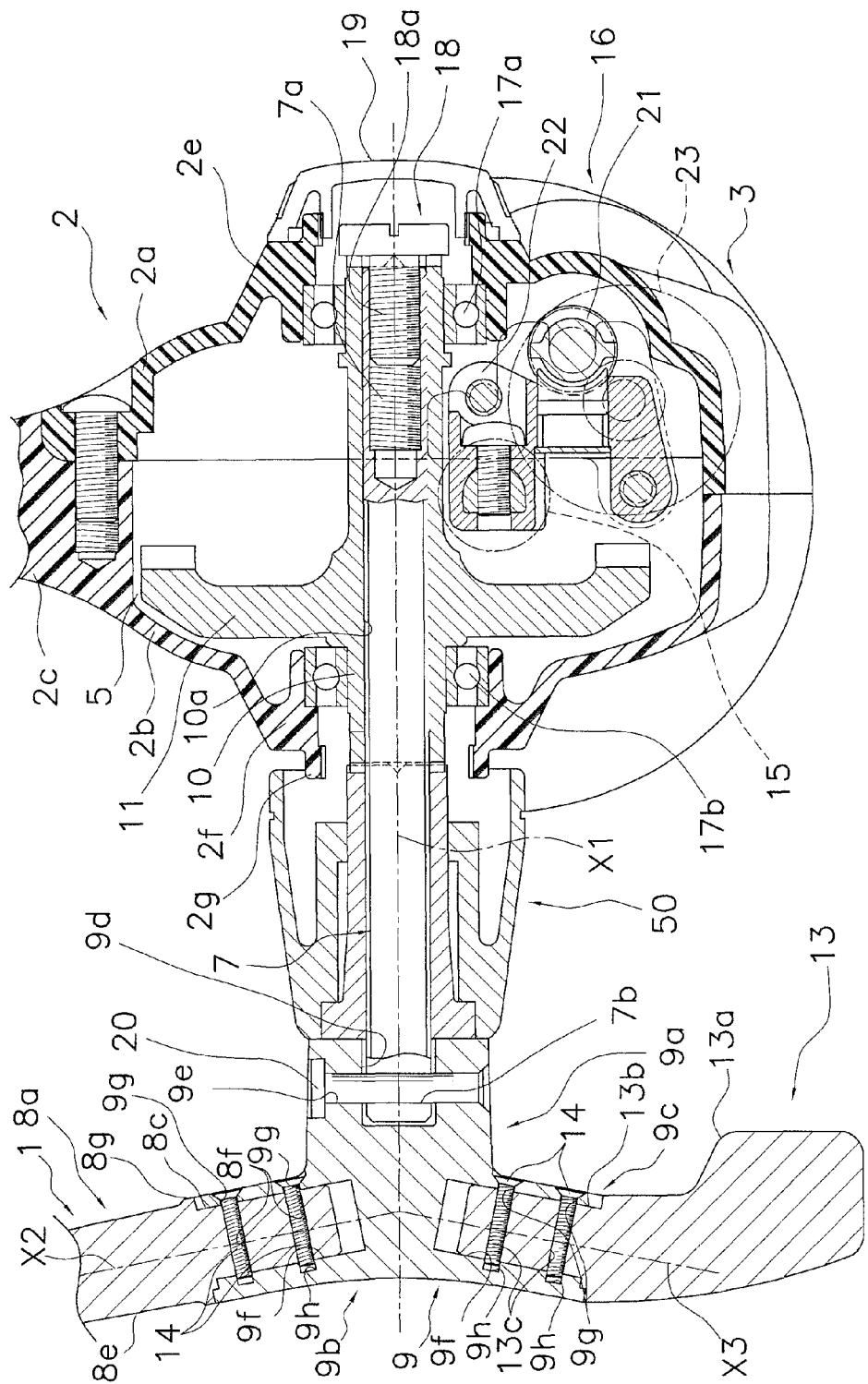
FIG. 5 is an enlarged cross-sectional view of the spinning reel corresponding to FIG. 3 with a weight member attached.

The handle assembly 1 can be interchangeably used as either the double-handle assembly or the single-handle assembly. As illustrated in FIG. 1, the handle assembly 1 includes handle knobs 6, a handle shaft 7, first and second handle arms 8a and 8b, and an arm attachment 9. In this case, the handle assembly 1 is used as the double-handle assembly. As illustrated in FIG. 5, the handle assembly 1 further includes a weight member 13 for enhancing its rotation balance when being used as the single-handle assembly.

Referring to FIGS. 1 and 2, the handle knob 6 is usually handled while being grasped by an angler's finger tips. The handle knobs 6 are rotatably attached to the tips of the first and second handle arms 8a and 8b, respectively. Additionally, knob shafts 6a are secured to the tips of the first and second handle arms 8a and 8b, respectively. The handle knobs 6 are rotatably attached to the knob shafts 6a, respectively.

Figure 3:
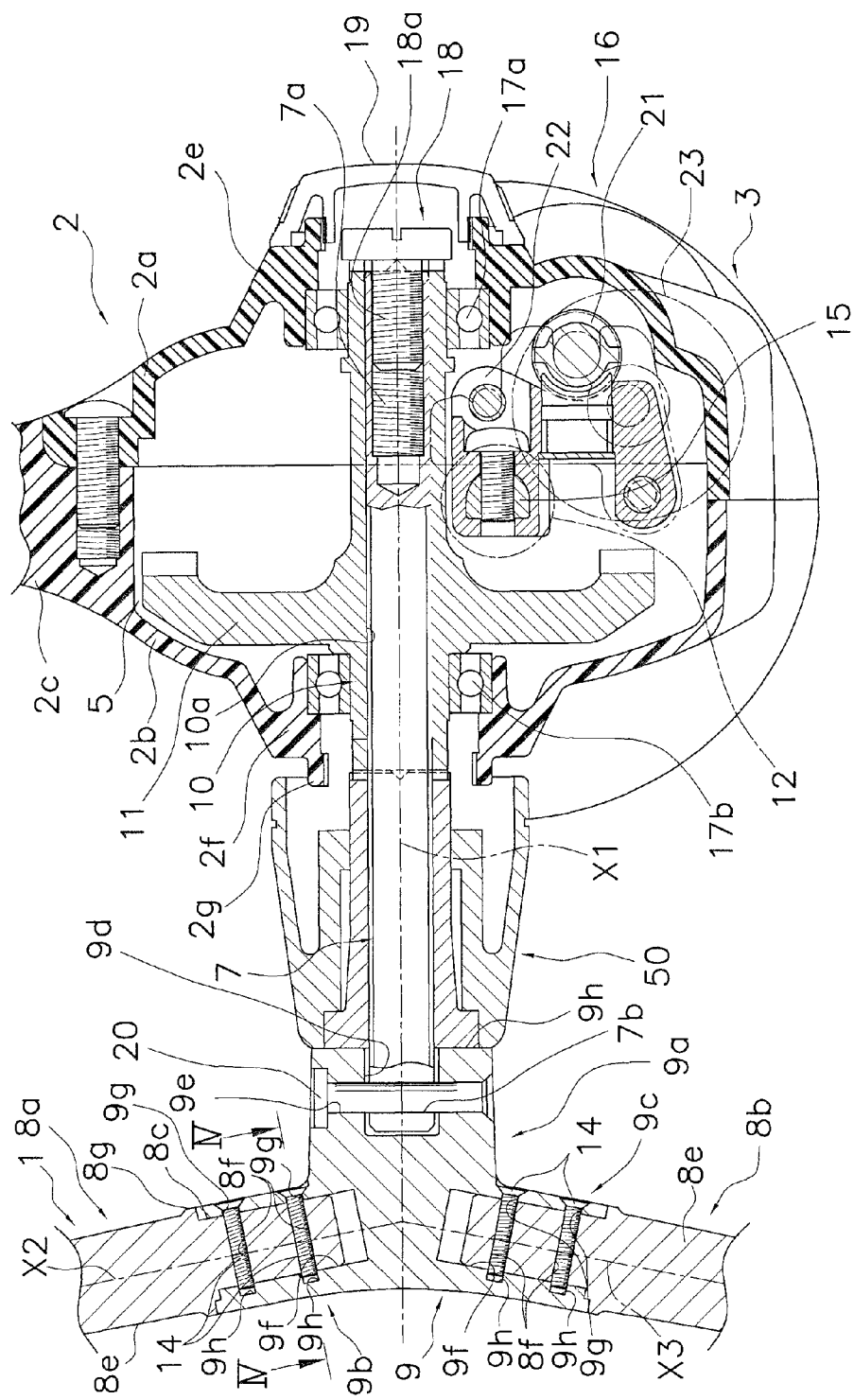
FIG. 3 is an enlarged cross-sectional view of the spinning reel of FIG. 2 sectioned along a handle shaft.

The handle shaft 7 is a stick-shaped member made of stainless alloy, for instance. As illustrated in FIG. 3, the outer shape of the handle shaft 7 is formed in a noncircular (e.g., rectangular) shape. The handle shaft 7 is inserted into a non-circular through hole 10a of a master gear shaft 10 to be described. The handle shaft 7 can rotate unitarily with the master gear shaft 10. Simultaneously, the handle shaft 7 can axially reciprocate back and forth. The handle shaft 7 includes a female-threaded portion 7a in the radial center of the front end thereof (see right end of the handle shaft 7 in FIG. 3). A male-threaded portion 18a of a bolt member 18 is screwed into the female-threaded portion 7a of the handle shaft 7 inserted into the through hole 10a. The handle shaft 7 is thereby retained with respect to the master gear shaft 10. Further, the handle shaft 7 includes a pin through hole 7b in its base end, i.e., the end inserted in the arm attachment 9 (see the left end of the handle shaft 7 in FIG. 3). A caulking pin 20 penetrates the pin through hole 7b for coupling the arm attachment 9 to the handle shaft 7. The arm attachment 9 is coupled to the handle shaft 7 by the caulking pin 20 while being capable of pivoting and rotating unitarily with the handle shaft 7.

As illustrated in FIG. 1, the shapes of the first and second handle arms 8a and 8b are identical. Referring to FIG. 2, the first handle arm 8a is disposed along a first axis X2 intersecting an axis X1 of the handle shaft 7. On the other hand, the second handle arm 8b is disposed along a second axis X3 disposed on the opposite side of the first axis X2 across the axis X1. In other words, the first axis X2 intersects with the second axis X3 at the axis X1. The first and second axes X2 and X3 are reflected along the axis X1, which is a line of symmetry. Further, the first and second axes X2 and X3 lean from a direction perpendicular to the handle shaft 7 towards an axial-outward direction of the handle shaft 7 (to the leftward in FIG. 3), i.e., away from the reel unit 2. Regarding the handle arms 8a and 8b, only the first handle arm 8a will be hereinafter explained without explaining the second handle arm 8b. This is because the second handle arm 8b has an identical structure as that of the first handle arm 8a.

The first handle arm 8a is a stick-shaped member made of metal (e.g., aluminum alloy), for instance. As illustrated in FIGS. 1, 2, and 3, the first handle arm 8a includes a non-circular shaft 8c and a knob support 8d. The non-circular shaft 8c is formed at the base end of the first handle arm 8a, i.e., the end inserted in the arm attachment 9. The non-circular shaft 8c is a portion attached to the arm attachment 9. The knob support 8d is formed in front end of the first handle arm 8a. The knob shaft 6a of the handle knob 6 is fixed to the knob support 8d. An intermediate part 8e of the first handle arm 8a is formed in a tapered columnar shape between the non-circular shaft 8c and the knob support 8d.

Figure 4:
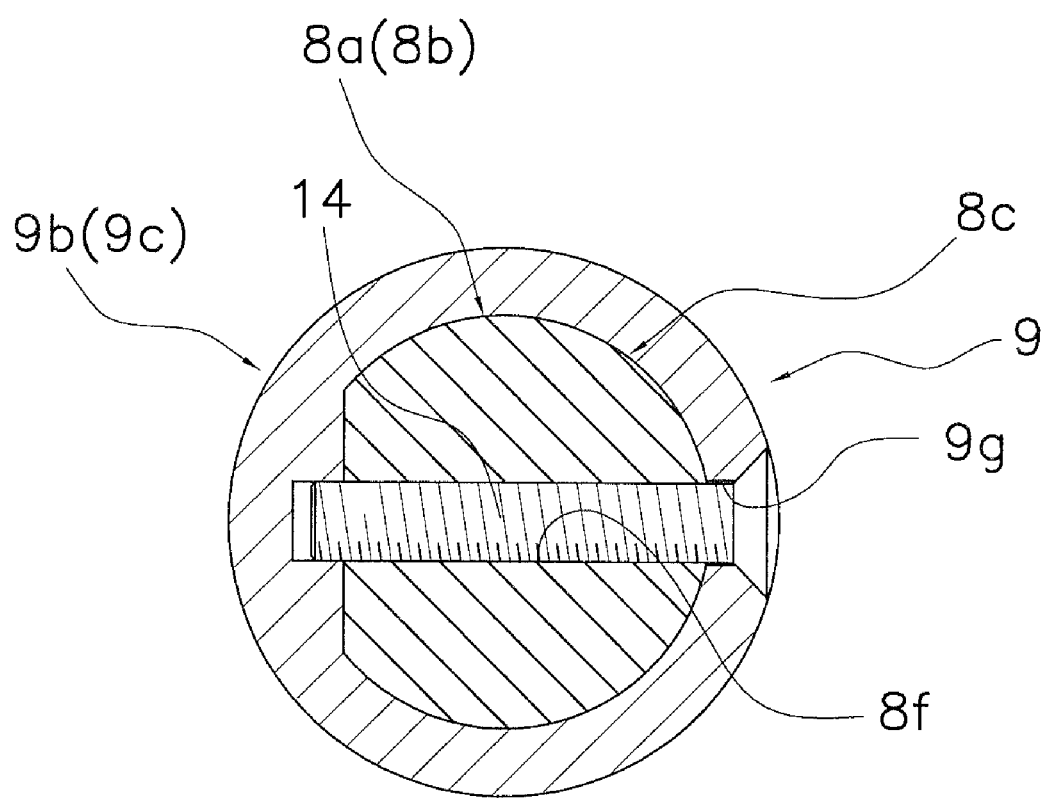
FIG. 4 is a cross-sectional view of the spinning reel of FIG. 3 sectioned along line IV-IV in FIG. 3.

As illustrated in FIG. 4, the non-circular shaft 8c has a "D" shaped or truncated circular cross-section formed by partially cutting out a circle with the diameter smaller than that of the intermediate part 8e. As illustrated in FIGS. 3 and 4, two female-threaded holes 8f are formed in the non-circular shaft 8c. The female-threaded holes 8f penetrate the non-circular shaft 8c in its diameter direction (i.e., a diameter direction perpendicular to the first shaft X2). The female-threaded holes 8f are spaced apart along the longitudinal direction (i.e., a direction of the first shaft X2) of the first handle arm 8a. As illustrated in FIG. 2, the knob shaft 6a is secured to the knob support 8d by caulking. As illustrated in FIG. 3, the non-circular shaft 8c is secured to the arm attachment 9, for instance, by two screw members 14 (an example of the first and second screw members). The screw members 14 are flat head bolt members screwed into the female-threaded holes 8f. The first handle arm 8a includes a large-diameter portion 8g in the boundary part between the intermediate part 8e and the non-circular shaft 8c. The large-diameter portion 8g has a diameter that is larger than that of the intermediate part 8e and the non-circular shaft 8c. When the first handle arm 8a is attached to the arm attachment 9, its longitudinal position is set by the step formed by the large-diameter portion 8g and the non-circular shaft 8c.

The arm attachment 9 is, for instance, a synthetic resin member or a metal member made of zinc alloy or the like. As described above, the arm attachment 9 is configured to rotate unitarily with the handle shaft 7. The arm attachment 9 is a "Y" shaped member. The arm attachment 9 includes a coupling portion 9a, and first and second attachment portions 9b and 9c. The front end of the coupling portion 9a is coupled to the handle shaft 7. The first attachment portion 9b extends from the base end, i.e., the end opposite the end facing the reel unit 2, of the coupling portion 9a along a direction of the first axis X2, whereas the second attachment portion 9c extends from the base end of the coupling portion 9a along a direction of the second axis X3.

The coupling portion 9a is formed in a cylindrical shape. Its base end has the diameter slightly greater than that of the front end, i.e., the end facing the reel unit 2. As seen in FIG. 3, the coupling portion 9a includes a coupling recess or aperture 9d in the radial center of the front end thereof. The handle shaft 7 is pivotably coupled to the coupling recess 9d. The coupling recess 9d is formed in a slit shape. Specifically, the coupling recess 9d is cut out from the radial center of the coupling portion 9a towards the outer peripheral surface thereof. In other words, the recess 9d has an open end, a second end opposite the open end, and a wall portion joining the open and closed ends. The second end can be closed. Additionally, the coupling portion 9a includes a pin attachment hole 9e. The pin attachment hole 9e radially penetrates the coupling portion 9a while intersecting the coupling recess 9d, The caulking pin 20 is attached to the coupling portion 9a while penetrating both the pin attachment hole 9e and the pin through hole 7b. Thus, when attached the arm attachment is attached to the handle shaft 7, the open end faces the reel unit 2, the wall portion extends parallel or substantially parallel to the axis X1, and the caulking pin 20 extends perpendicular or substantially perpendicular to the axis X1.

The first and second attachment portions 9b and 9c are formed in a roughly tubular shape, respectively. The first attachment portion 9b allows one of the base ends of the first and second handle arms 8a and 8b to be detachably attached thereto, while preventing it from rotating about the first axis X2 that intersects the axis X1 of the handle shaft 7. On the other hand, the second attachment portion 9c allows the other of the base ends of the first and second handle arms 8a and 8b to be detachably attached thereto, while preventing it from rotating about the second axis X3. The outer peripheral surfaces of the front ends of the first and second attachment portions 9b and 9c continue to the outer peripheral surface of the large-diameter portion 8g of the first handle arm 8a.

The first attachment portion 9b is formed along the first axis X2, whereas the second attachment portion 9c is formed along the second axis X3. Each of the first and second attachment portion 9b and 9c includes a non-circular recess or aperture 9f to be engaged with the non-circular shaft 8c. As illustrated in FIG. 3, each of the first and second attachment portions 9b and 9c has the non-circular recess or aperture 9f, which is recessed towards the axis X1 from a position slightly separated from the front end surfaces thereof. Each recess 9f has an open end, a second end opposite the open end, and a wall portion joining the open and closed ends. The second end can be closed. In the recess 9f of the first attachment portion 9b, the second end faces and is closer to the axis X1 than the open end. Further, the wall portion is parallel to or substantially parallel to the first axis X2. In the recess 9f of the second attachment portion 9c, the second end faces and is closer to the axis X1 than the open end. Further, the wall portion is parallel to or substantially parallel to the second axis X3. As illustrated in FIG. 4, each of the non-circular recesses 9f has a "D" shaped or truncated circular cross-section for engaging with the non-circular shaft 8c. Each of the first and second attachment portions 9b and 9c includes two insertion holes 9g for inserting the screw members 14. The insertion holes 9g of the first attachment portion 9b are spaced apart along the first axis X2 to be parallel or substantially parallel thereto, whereas the insertion holes 9g of the second attachment portion 9c are spaced apart along the second axis X3 to be parallel or substantially parallel thereto. Further, the insertion holes 9g of the first attachment portion 9b are formed in the inside lateral part, that is, the lateral part positioned on the same side of the handle shaft 7. The insertion holes 9g of the first attachment portion 9b are perpendicular to the first axis X2. Similarly, the insertion holes 9g of the second attachment portion 9c are formed in the inside lateral part, that is, the lateral part positioned on the same side of the handle shaft 7. The insertion holes 9g of the second attachment portion 9c are perpendicular to the second axis X3. The four screw members 14 are inserted into the first and second attachment portions 9b and 9c roughly along the direction that the handle shaft 7 is attached to the coupling portion 9a. Then, the screw members 14 are screwed into the four female threaded holes 8f. The screw members 14 are herein provided for retaining and securing the first and second handle arms 8a and 8b with respect to the first and second attachment portions 9b and 9c. Each of the insertion holes 9g has a tapered spot facing for accommodating the screw member 14 without making it protrude therefrom. Further, each of the first and second attachment portions 9b and 9c includes two support holes 9h in the outside lateral part thereof, that is, the lateral part opposed to the inside lateral part where the screw members 14 are inserted. Each support hole 9h has a diameter smaller than that of each insertion hole 9g. Specifically, the diameter of each support hole 9h is greater than the maximum diameter of the threaded portion of the screw member 14 by roughly 0.1-0.5 mm. With this structure, the tip of the screw member 14 is supported by the support hole 9h.

As illustrated in FIG. 5, the weight member 13 is configured to be attached to either of the first and second attachment portions 9b and 9c of the arm attachment 9. The weight member 13 includes a weight 13a and a non-circular shaft 13b. The weight 13a and the non-circular shaft 13b are integrally formed, and can be a one piece unitary member. The non-circular shaft 13b is formed in a shape similar or identical to the first and second handle arms 8a and 8b. Therefore, the non-circular shaft 13b can be secured to either the first attachment portion 9b or the second attachment portion 9c by the screw members 14. The weight 13a is inwardly curved in the axial direction of the handle shaft 7, i.e., in a direction toward the reel unit 2. Accordingly, the fishing line does not easily become stuck or entangled with the weight 13a.

A shaft guard member 50 is interposed between the arm attachment 9 and the master gear shaft 10. The shaft guard member 50 functions as a collar. The shaft guard member 50 is coupled to the handle shaft 7 to rotate integrally with it. When the handle assembly 1 is attached to the reel unit 2, the shaft guard member 50 is held between the tip surface of the arm attachment 9 and an end surface of the master gear shaft 10. The shaft guard member 50 integrally rotates with the arm attachment 9 and the master gear shaft 10.

When the handle assembly 1 is folded, the cap member 19 is removed and the bolt member 18 tightly screwed into the handle shaft 7 is loosen to produce a clearance between the shaft guard member 50 and the tip surface of the arm attachment 9. Then, the arm attachment 9 is pivoted about the caulking pin 20 towards the reel unit 2. Accordingly, the handle assembly 1 can be folded.

As illustrated in FIGS. 1, 2, and 3, the reel unit 2 includes a reel body 2a, a lid member 2b, a rod attachment leg 2c, and a cover member 2d. The reel body 2a has an opening. The lid member 2b is detachably attached to the reel body 2a to cover the opening. The rod attachment leg 2c extends obliquely upward and forward from the lid member 2b. The cover member 2d is attached to the rear and bottom parts of the reel body 2a and the lid member 2b. The reel body 2a has an inner space. The inner space accommodates a rotor driving mechanism 5 and an oscillation mechanism 16. The rotor driving mechanism 5 is configured to rotate the rotor 3 in conjunction with rotation of the handle assembly 1. The oscillating mechanism 16 is configured to move the spool 4 back and forth for uniformly rewinding the fishing line.

As illustrated in FIG. 3, the rotor driving mechanism 5 includes a master gear 11 and a pinion gear 12. The master gear 11 rotates together with the master gear shaft 10. The handle shaft 7 of the handle assembly 1 is attached to the master gear shaft 10 in a non-rotatable state. The pinion gear 12 meshes with the master gear 11. As illustrated in FIG. 3, the master gear shaft 10 is a tubular member formed integrally with or separately from the master gear 11. The master gear shaft 10 includes the through hole 10a. The inner periphery forming the through hole 10a has a noncircular (rectangular) cross-section. The master gear shaft 10 is rotatably supported by bearings 17a and 17b in the reel unit 2. The bearing 17a is herein attached to the inner periphery of a boss 2e protruding from one lateral side of the reel unit 2, whereas the bearing 17b is attached to the inner periphery of a boss 2f protruding from the other lateral side of the reel unit 2. The master gear 11 is a face gear that meshes with the pinion gear 12. The pinion gear 12 is formed in a tubular shape and penetrates through the center part of the rotor 3. The front part of the pinion gear 12 is secured to the rotor 3 by a nut. Further, the intermediate part and the rear end part of the pinion gear 12 are rotatably supported by bearings in the reel unit 2, respectively.

As illustrated in FIG. 3, the oscillating mechanism 16 is configured to move the spool shaft 15 coupled to the spool 4 back and forth in order to move the spool 4 back and forth. The oscillating mechanism 16 includes a worm shaft 21, a slider 22 and an intermediate gear 23. The worm shaft 21 is disposed obliquely below the spool shaft 15 while being in parallel to it. The slider 22 moves back and forth along the worm shaft 21. The intermediate gear 23 is secured to the tip of the worm shaft 21. The slider 22 is secured to the rear end of the spool shaft 15 in a non-rotatable state. The intermediate gear 23 meshes with the pinion gear 12 through a speed reduction mechanism (not illustrated in the figure). The speed reduction mechanism reduces the moving speed of the oscillating mechanism 16 in the back-and-forth direction. Accordingly, the fishing line can be densely and finely wound onto the spool 4.

As illustrated in FIG. 1, the rotor 3 includes a cylinder 30, a first rotor arm 31, and a second rotor arm 32. The cylinder 30 is coupled to the pinion gear 12 while being integrally rotatable with it. The first and second rotor arms 31 and 32 are positioned lateral to the cylinder 30 while being opposed to each other. The cylinder 30, the first rotor arm 31, and the second rotor arm 32 are unitarily formed. Further, a bail arm 34 is attached to the tips of the first and second rotor arms 31 and 32 to guide the fishing line. The bail arm 23 can be pivoted between a fishing-line rewinding posture illustrated in FIG. 1 and a fishing-line releasing posture flipped from the fishing-line rewinding posture by roughly 90 degrees.

As illustrated in FIG. 1, the spool 4 is disposed between the first and second rotor arms 31 and 32 of the rotor 3. The spool 4 includes a bobbin trunk 4a, a skirt 4b, and a front flange 4c. The fishing line is wound onto the bobbin trunk 4a. The skirt 4b is disposed on the outer peripheral side of the cylinder 30 of the rotor 3. The front flange 4c is disposed in front of the bobbin trunk 4a. The spool 4 is coupled to the spool shaft 15 through a drag mechanism (not illustrated in the figure).

Next, operations and actions of the reel will be explained.

To reel out the fishing line from the reel unit 2 by casting in fishing, the bail arm 34 can be flipped from the fishing-line winding posture to the fishing-line releasing posture by a finger of an angler. Under this condition, the fishing rod can be cast while the fishing line is hooked by the index finger of an angler's hand holding the fishing rod. Accordingly, the fishing line is released forward with high momentum due to the weight of the tackle. When the handle assembly 1 is then rotated in the fishing-line winding direction, the rotor driving mechanism 5 rotates the rotor 3 in the fishing-line winding direction and a bail flipping mechanism (not illustrated in the figure) returns the bail arm 34 to the fishing-line rewinding posture. Accordingly, the fishing line is wound around the spool 4.

For example, when frequent re-casting of the fishing line is required in fishing, the handle assembly is used as the double-handle assembly. On the other hand, when the fishing line is easily loosened in fishing, the handle assembly is used as the single-handle assembly. When the double-handle assembly is changed into the single-handle assembly, either of the first and second handle arms 8a and 8b is removed from the arm attachment 9 by removing the screw members 14 and the weight member 13 is instead attached thereto.

With the foregoing structure, the handle assembly 1 can be used as the single-handle assembly only by removing either of the handle arms (e.g., the second handle arm 8b) from the arm attachment 9.

Further, torque of either of the first and second handle arms 8a and 8b is transmitted to the handle shaft 7 through the arm attachment 9. Therefore, the strength of the handle assembly is not changed regardless of its usage whether it is used as the double-handle assembly or the single-handle assembly.

Furthermore, the first and second handle arms 8a and 8b are prevented from rotating with respect to the arm attachment 9 by the noncircular engagement. The screw members 14 are thereby only required to retain and to secure either of the first and second handle arms 8a and 8b with respect to the arm attachment 9. With this structure, bending force and torsional force, acting on either of the first and second handle arms 8a and 8b in winding the fishing line, do not act on the screw members 14. Consequently, the screw members 14 have little chance to be ruptured even if they have relatively small diameters.

Features (A) The handle assembly 1 can integrally rotate with the handle shaft 7 of the fishing reel. The handle assembly 1 includes the handle knobs 6, the first and second handle arms 8a and 8b and the arm attachment 9. The handle knobs 6 are rotatably attached to the tips of the first and second handle arms 8a and 8b, respectively. The arm attachment 9 can integrally rotate with the handle shaft 7. The arm attachment 9 includes the first attachment portion 9b where the base end of one of the first and second handle arms 8a and 8b is detachably attached while being prevented from rotating about the first axis X2 intersecting the axis X1 of the handle shaft 7. The arm attachment 9 further includes the second attachment portion 9c where the base end of the other of the first and second handle arm 8a and 8b is detachably attached while being prevented from rotating about the second axis X3 opposed to the first axis X2 through the handle shaft 7.

When the handle assembly 1 is used as the double-handle assembly, the first handle arm 8a is attached to one of the first and second attachment portions 9b and 9c whereas the second handle arm 8b is attached to the other of the first and second attachment portions 9b and 9c. When the handle assembly 1 is used as the singe handle assembly, on the other hand, either the first handle arm 8a or the second handle arm 8b is attached to either the first attachment portion 9b or the second attachment portion 9c. In this case, the first and second attachment portions 9b and 9c of the arm attachment 9 can be detachably attached to the first and second handle arms 8a and 8b while preventing them from rotating about the first and second axes X2 and X3 intersecting the handle shaft 7. With the structure, positions of the first and second handle arms 8a and 8b around the first and second axes X2 and X3 can be aligned to be in parallel to the handle shafts of the handle knobs 6.

(B) The first attachment portion 9b includes the noncircular recess 9f formed along the direction of the first axis X2, whereas the second attachment portion 9c includes the noncircular recess 9f formed along the direction of the second axis X3. Further, the first and second handle arms 8a and 8b include the non-circular shafts 8c to be engaged with the noncircular recesses 9f in their base ends, respectively. In this case, engagement between the noncircular recesses 9f and the non-circular shafts 8c make it possible to attach the first and second handle arms 8a and 8b to the first and second attachment portions 9b and 9c to prevent them from rotating about the first and second axes X2 and X3. Therefore, the simple structure of engagement between the shafts and the recesses enables the first and second handle arms 8a and 8b to be attached to the first and second attachment portions 9b and 9c.

(C) The handle assembly further includes the weight member 13. The weight member 13 includes the noncircular shaft 13b in its base end. The weight member 13 can be detachably and non-rotatably attached to at least either the first attachment portion 9b or the second attachment portion 9c. When the handle assembly is used as the single-handle assembly in this case, the weight member 13 can be attached to the second attachment portion 9c to which the first handle arm 8a is not attached. Rotation balance of the handle assembly can be thereby enhanced even if the handle assembly is used as the single-handle assembly.

(D) The handle assembly further includes the screw members 14. The screw members 14 are inserted into the first and second attachment portions 9b and 9c in the directions intersecting the first and second axes X2 and X3, respectively, which are roughly the same as the direction in which the handle shaft 7 is attached to the first attachment portion 9b. The screw members 14 are then screwed into the base ends of the first and second handle arms 8a and 8b, respectively. In this case, the first and second handle arms 8a and 8b are secured to the first and second attachment portions 9b and 9c by the screw members 14, respectively. With this structure, attachment/detachment of the first and second handle arms 8a and 8b is easily achieved.

(E) When the fishing reel is a spinning reel, the handle assembly 1 further includes the handle shaft 7 that can integrally rotate with the arm attachment 9. One end of the handle shaft 7 is coupled to the master gear shaft 10 while being integrally rotatable with it, whereas the other end of the handle shaft 7 is coupled to the arm attachment 9. In this case, when the handle assembly of the spinning reel is used as the double-handle assembly, orientations of the handle knobs can be aligned.

(F) The first and second axes X2 and X3 are symmetrically disposed through the axis X1 of the handle shaft 7 while leaning towards the axial-outward direction of the handle shaft 7 from the direction perpendicular to the handle shaft 7. In this case, the tips of the first and second handle arms 8a and 8b are disposed away from the base ends thereof in the axial outward direction of the handle shaft. Accordingly, the first and second handle arms 8a and 8b can be disposed away from the bail arm 34, which is a fishing-line guiding member of the rotor 3 of the spinning reel.

Other Exemplary Embodiments

Other exemplary embodiments will now be explained. In view of the similarity between the first and other embodiments, the parts of the other embodiments that are identical to the parts of the first embodiment will be given the same reference numerals as the parts of the first embodiment. Moreover, the descriptions of the parts of the other embodiments that are identical to the parts of the first embodiment may be omitted for the sake of brevity.

An exemplary embodiment has been described above. However, the present invention is not limited to the aforementioned exemplary embodiment. A variety of changes and modifications are possible to the aforementioned exemplary embodiment without departing from the scope of the present invention.

(a) In the aforementioned exemplary embodiment, the handle knob 6 to be grasped with an angler's finger tips is used in the single-handle assembly. However, the present invention is not limited to the configuration.

Figure 6:
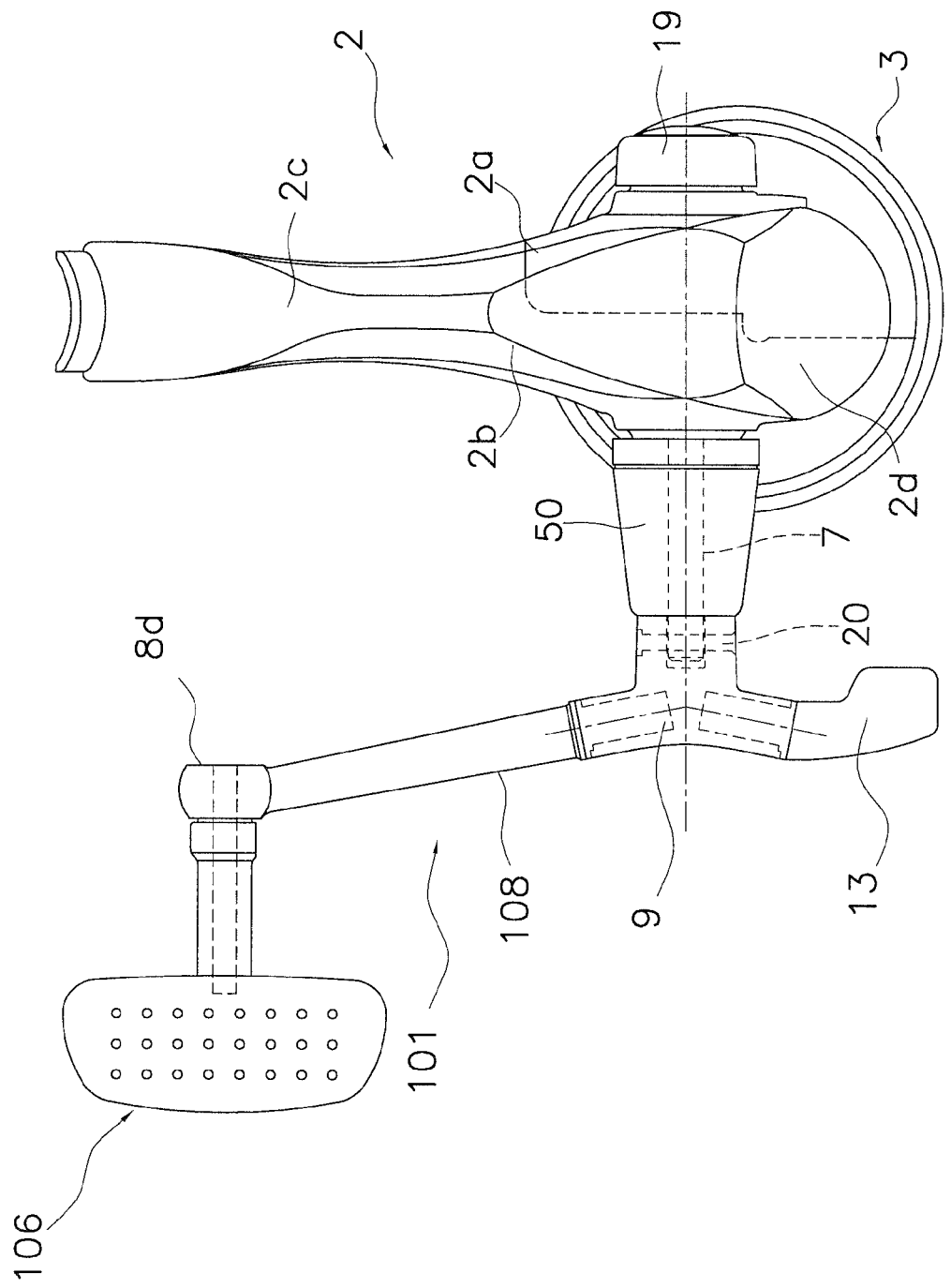
FIG. 6 is a rear view of a spinning reel corresponding to FIG. 2 in accordance with another exemplary embodiment.

In FIG. 6, a roughly T-shaped handle knob 106 can be held with the angler's hand is mounted to a third handle arm 108. Thus, a handle assembly 101 may further include the third handle knob 106 of the foregoing structure. Further, the handle assembly 101 may include the third handle arm 108 instead of the first handle arm 8a or the second handle arm 8b.

(b) In the aforementioned exemplary embodiment, the fishing spinning reel has been described as an example of the handle assembly 1. However, the present invention is not limited to this.

Figure 7:
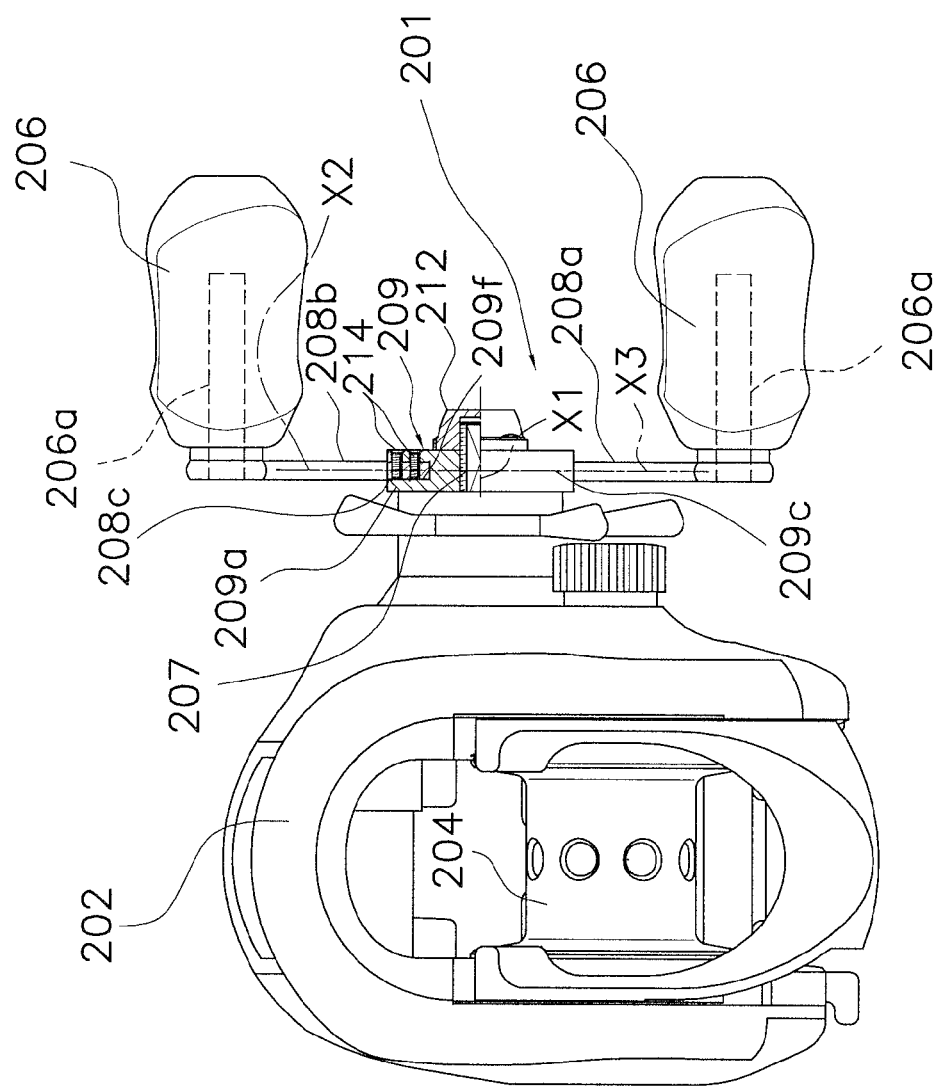
FIG. 7 is a plan view of a dual bearing reel in accordance with still another exemplary embodiment.

In FIG. 7, a handle assembly 201 includes an arm attachment 209, first and second handle arms 208a and 208b, and handle knobs 206. The arm attachment 209 is attached to a handle shaft 207 of a dual-bearing reel to rotate integrally with it.

The handle knob 206 includes knob shafts 206a secured to the tips of the first and second handle arms 208a and 208b. The first and second handle arms 208a and 208b are plate members formed with an identical shape. Each of the first and second handle arms 208a and 208b is detachably and non-rotatably secured to the arm attachment 209 by screw members 214. Each of the attachment portions has the thickness slightly thinner than that of the other portions.

The arm attachment 209 is secured to the handle shaft 207 by a nut member 212 while being integrally rotatable with it. The handle shaft 207 is rotatably supported by a reel unit 202. Rotation of the handle shaft 207 is transmitted to a spool 204.

The arm attachment 209 includes first and second attachment portions 209b and 209c. Both a non-circular shaft 208c and a noncircular recess or aperture 209f have rectangular cross-sections. In the exemplary embodiment (b), the first and second axes X2 and X3 are perpendicular to the axis X1 of the handle shaft 207.

As described above, the handle assembly can be applied to the dual-bearing reels.

(c) In the aforementioned exemplary embodiment, the first and second handle arms are prevented from rotating with respect to the arm attachment by a non-circular engagement. The anti-rotation structure is not necessarily achieved by the non-circular engagement.

Figure 8:
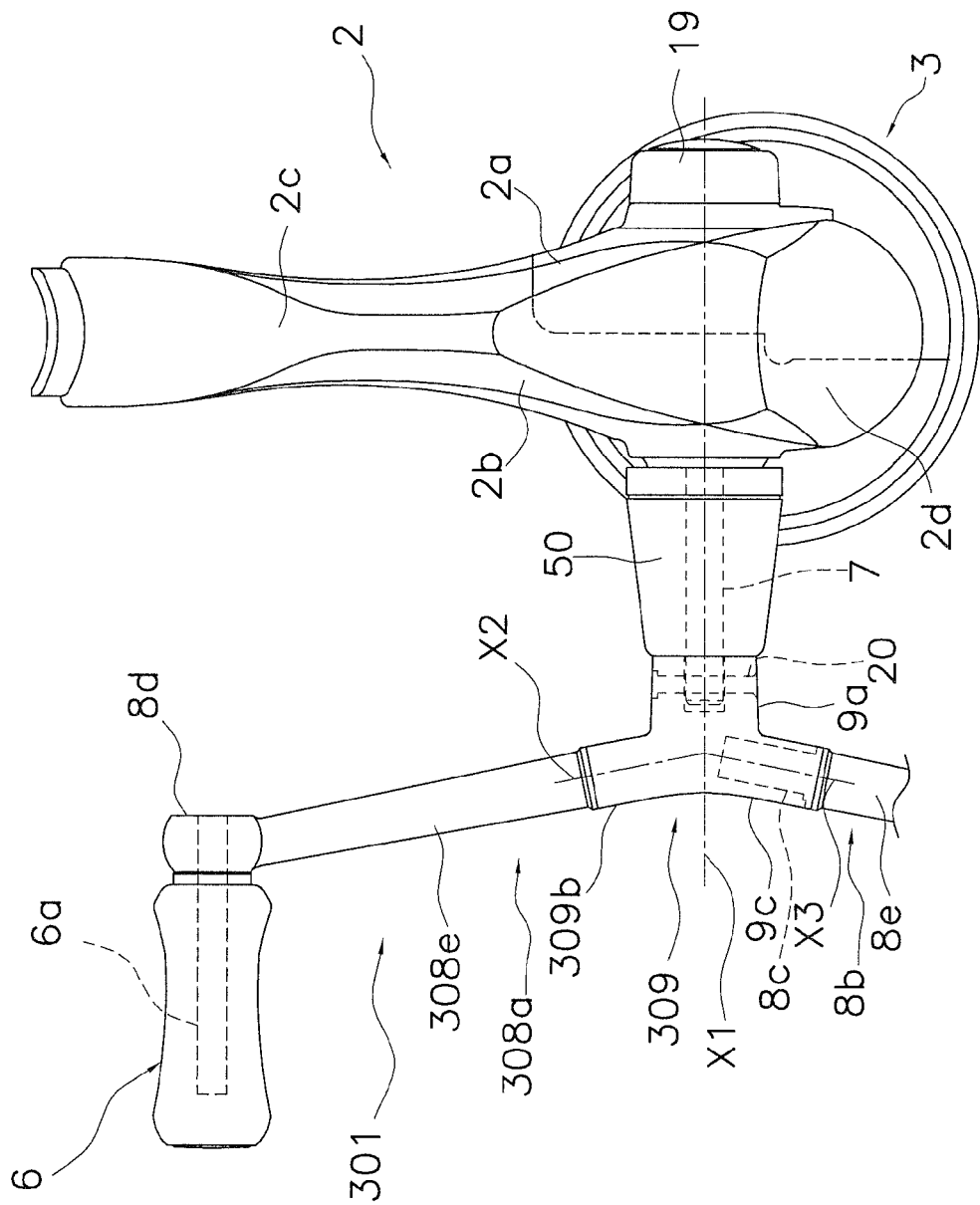
FIG. 8 is a rear view of a spinning reel corresponding to FIG. 2 in accordance with still another exemplary embodiment.

(d) In the aforementioned exemplary embodiment, the first and second handle arm can be detachably attached to the first and second attachment portions. However, the present invention is not limited to the configuration. In FIG. 8, a first attachment portion 309b of an arm attachment 309 is integrally formed with an intermediate part 308e of a first handle arm 308a. Thus, the first attachment portion 309b can be formed with the intermediate part 308e as a one piece unitary member.

Therefore, the first handle arm 308a is undetachably mounted to the first attachment portion 309b to be non-removable. However, the second attachment portion 9c can be detachably attached to the second handle arm 8b, the third handle arm 108, or the weight member 13 in the same or similar way as described in the aforementioned embodiments. Since the other structures are similar to FIG. 2, the explanations are omitted. Furthermore, the first handle arm 308a can be undetachably fixed to the first attachment portion 309b by an appropriate fixing method such as adhesion or welding instead of integrally or unitarily forming it with the first attachment portion 309b.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including", "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a fishing reel equipped with the present invention. Accordingly, these terms, as utilized to describe the present invention should be interpreted relative to a fishing reel equipped with the present invention as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A fishing reel handle assembly comprising:
    a handle shaft having an axis, the handle shaft having a first shaft end and a second shaft end opposite to the first shaft end;
    a first handle knob;
    a weight member;
    a first handle arm having a first attachment end and a first base end opposite the first attachment end, the first handle knob being rotatably attached to the first attachment end of the first handle arm;
    an arm attachment configured on the first shaft end to rotate integrally with the handle shaft, the arm attachment including
        a first attachment portion allowing the first base end of the first handle arm to be detachably attached to the first attachment portion, the first attachment portion preventing the first base end of the first handle arm from rotating about a first axis intersecting the axis of the handle shaft, the first attachment portion including a non-circular recess formed along the first axis, and
        a second attachment portion including a second non-circular recess formed along the second axis intersecting with the axis of the handle shaft, the second attachment portion allowing the weight member to be detachably attached to the second attachment portion,
    the weight member including a third base end and at least one non-circular shaft on the base end thereof; the weight member being curved and extending towards the second shaft end,
    the non-circular shaft of the weight member engaging with the second non-circular recess of the second attachment portion,
    the first handle arm including a non-circular shaft at the base end thereof,
    the noncircular shaft of the first handle arm engaging with the non-circular recess of the first attachment portion.

2. The fishing reel handle assembly according to claim 1, wherein
    the weight member is replaceable with a second handle arm having a second base end and a second attachment end,
    the second attachment end engages with a second knob,
    the second handle arm includes a second non-circular shaft at the second base end, and
    the non-circular shaft of the second handle arm engages with the second non-circular recess of the second attachment portion when attached.

3. The fishing reel handle assembly according to claim 2, wherein
    the fishing reel handle assembly is a spinning reel handle assembly,
    the handle shaft has a base end and a second end,
    the second end of the handle shaft is coupled to a master gear shaft of a master gear to allow the handle shaft to rotate integrally with the master gear, and
    the base end of the handle shaft is coupled to the arm attachment.

4. The fishing reel handle assembly according to claim 2, wherein
    the weight member is shorter than the second handle arm.

5. The fishing reel handle assembly according to claim 3, wherein the first and second axes are symmetrically positioned through the handle shaft while extending towards an axial-outward direction away from the master gear.

6. The fishing reel handle assembly according to claim 1, further comprising
    a first screw member inserted into the first attachment portion along a first handle attachment direction intersecting the first axis, the first screw member being further screwed into the first base end of the first handle arm.

7. The fishing reel handle assembly according to claim 1, further comprising
    a second screw member inserted into the second attachment portion along a second handle attachment direction intersecting the second axis.

8. The fishing reel handle assembly according to claim 1, wherein
    the non-circular shaft of the weight member is substantially D-shaped, and
    the non-circular shaft of the first handle arm is substantially D-shaped.

9. A fishing reel handle assembly comprising:
    a handle shaft having an axis, the handle shaft having a first shaft end and a second shaft end opposite to the first shaft end;
    a first handle knob;
    a weight member;
    a first handle arm having a first attachment end and a first base end opposite the first attachment end, the first handle knob being rotatably attached to the first attachment end of the first handle arm; and
    an arm attachment configured on the first shaft end to rotate integrally with the handle shaft, the arm attachment including
        a first attachment portion being irremovably attached to the first handle arm, the first attachment portion arranging the first handle arm along a first axis intersecting the axis of the handle shaft, the first attachment portion including a non-circular recess formed along the first axis and
        a second attachment portion including a second non-circular recess formed along the second axis intersecting with the axis of the handle shaft, the second attachment portion allowing the weight member to be detachable attached to the second attachment portion, the weight member including a third base end and at least one no-circular shaft on the base end thereof, the weight member being curved and extending towards the second shaft end, the non-circular shaft of the weight member engaging with the second non-circular recess of the second attachment portion, the first handle arm including a non-circular shaft at the first base end thereof, the noncircular shaft of the first handle arm engaging with the non-circular recess of the first attachment portion.

10. The fishing reel handle assembly according to claim 9, wherein the first handle arm is integrally formed with the first attachment portion.

11. The fishing reel handle assembly according to claim 10, wherein the first handle arm is formed as a one piece unitary member with the first attachment portion.

12. The fishing reel handle assembly according to claim 9, wherein the weight member is replaceable with a second handle arm having a second base end and a second attachment end, the second attachment end engages with a second knob, the second handle arm includes a second non-circular shaft at the second base end, and the non-circular shaft of the second handle arm engages with the second non-circular recess of the second attachment portion when attached.

* * * * *